(12) United States Patent
Dehan et al.

(10) Patent No.: US 6,421,531 B1
(45) Date of Patent: Jul. 16, 2002

(54) MOBILE TELEPHONE WITH ARTICULATED COVER AND REVOLVING CONTACTS

(75) Inventors: Christophe Dehan, Le Mans; Gerard Leroux, Nogent le Rotrou; Jean-Claude Prunier, Herblay, all of (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/355,231

(22) PCT Filed: Jan. 27, 1998

(86) PCT No.: PCT/FR98/00142

§ 371 (c)(1),
(2), (4) Date: Oct. 14, 1999

(87) PCT Pub. No.: WO98/33309

PCT Pub. Date: Jul. 30, 1998

(30) Foreign Application Priority Data

Jan. 28, 1997 (FR) .............................................. 97 00891
Jan. 28, 1997 (FR) .............................................. 97 00890

(51) Int. Cl.$^7$ ................................................. H04B 1/38
(52) U.S. Cl. .................... 455/90; 379/433.13; 455/550; 455/575
(58) Field of Search ......................... 455/90, 575, 550; 379/433.13, 433.4; 439/31; 16/232

(56) References Cited

U.S. PATENT DOCUMENTS 4,755,143 A    7/1988  Enomoto et al. ............. 439/31
5,111,503 A  * 5/1992  Takagi ........................ 379/433
5,117,073 A  * 5/1992  Mischenko ................ 200/61.7
5,237,488 A    8/1993  Moser et al. ................ 361/729
5,507,013 A    4/1996  Weadon et al. ................ 455/90
5,991,638 A  * 11/1999 Kim et al. ............. 379/433.13

FOREIGN PATENT DOCUMENTS

FR          2754412      4/1998
GB          2264748      9/1993
WO       WO 96/21988     7/1996

OTHER PUBLICATIONS

Patent Abstracts of Japan, Publication No. 07006842, "Connector Structure For Electronic Apparatus".
PCT International Search Report.

* cited by examiner

Primary Examiner—Doris H. To
Assistant Examiner—Edan Orgad
(74) Attorney, Agent, or Firm—Perman & Green, LLP

(57) ABSTRACT

The invention concerns a mobile telephone comprising a housing containing an electrical circuit and a bearing a cover fixed in articulation to this housing a comprising a microphone, revolving contact being integrated in one of the two hinges linking the cover to the housing, for providing electric connections between the electric circuit and the microphone. The hinges articulate the housing to the cover comprise two contacts integrated with the housing, each including a contact arm, the ends of the two contact arms elastically resting on the two conductive pads separated by an insulating material and integrated in the articulating part of the cover, such that when the cover rotates, the ends of the two contact arms define circular paths on the two conductive pads.

17 Claims, 3 Drawing Sheets

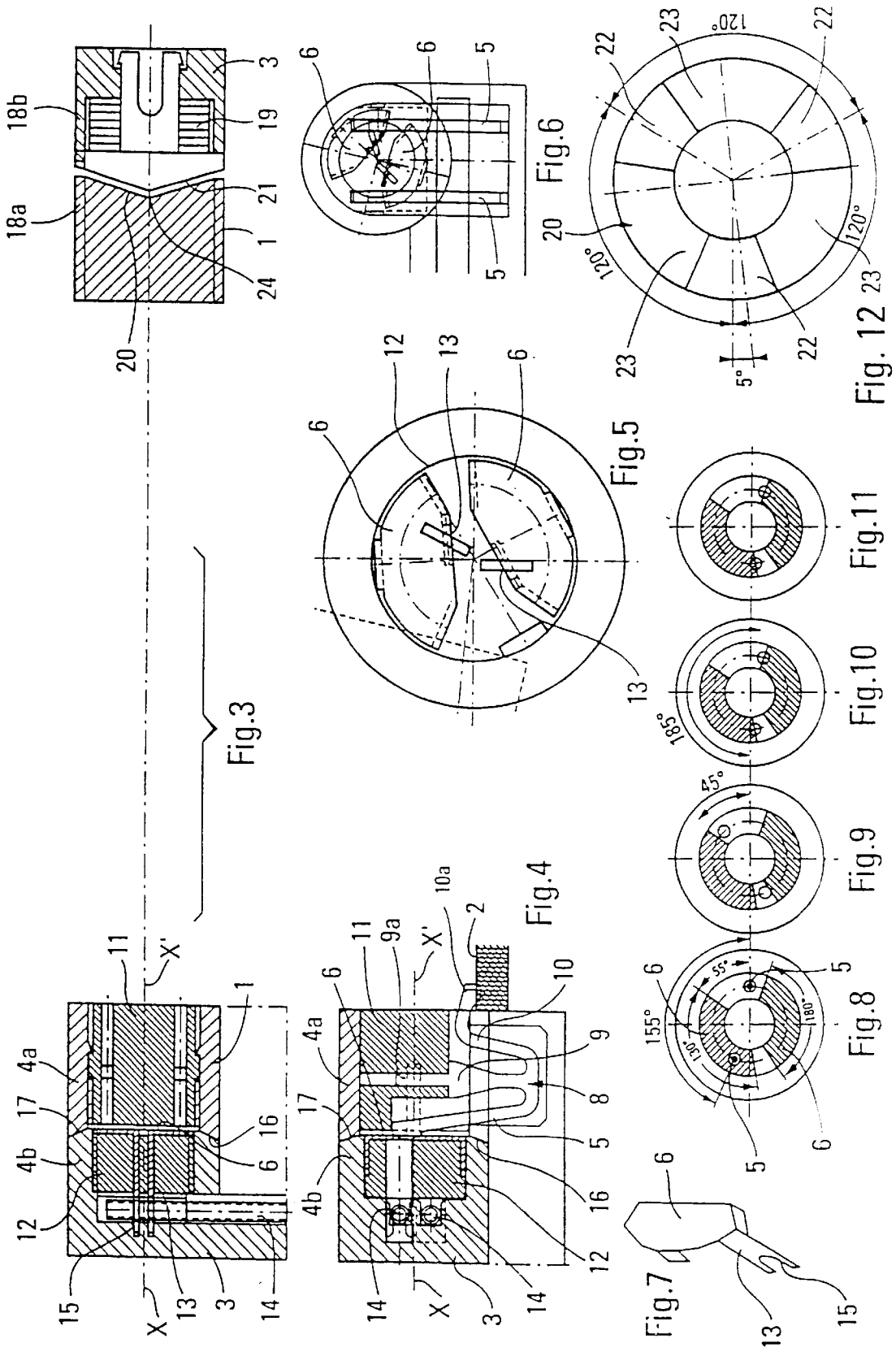

MOBILE TELEPHONE WITH ARTICULATED COVER AND REVOLVING CONTACTS

FIELD OF INVENTION

The present invention concerns a mobile telephone having a casing enclosing an electrical circuit and carrying a cover fixed to the casing in a hinged manner and incorporating a microphone.

BACKGROUND OF THE INVENTION

French patent application No 96 12 305 of Oct. 9, 1996 in the name of the applicant describes a mobile telephone of the above type in which rotary contacts are incorporated into one of two hinges connecting the cover to the casing to make electrical connections between the electrical circuit and the microphone.

WO 96 21 988 describes a mobile telephone comprising a casing enclosing an electrical circuit and carrying a cover fixed to the casing in a hinged manner and incorporating a microphone, rotary contacts being incorporated into one of two hinges connecting the cover to the casing to make electrical connections between the electrical circuit and the microphone. One of the hinges between the casing and the cover comprises two contacts attached to the casing and each including a contact arm, the ends of the two contact arms bearing elastically on two conductive areas separated by an insulative material and incorporated in the part of the hinge on the cover. Thus on rotation of the cover the ends of the two contact arms trace out two circular paths on the conductive areas.

In the above implementation, the two contacts bear on the conductive tracks transversely to the rotation axis of the hinge. This arrangement cannot guarantee a uniform or adequate contact pressure between the arms and the tracks regardless of the angular position of the cover relative to the casing.

The aim of the present invention is to improve prior art mobile telephones by increasing the reliability of the electrical connection made by the rotary contacts and facilitating their manufacture on an industrial scale.

SUMMARY OF THE INVENTION

In accordance with the invention, the above mobile telephone is characterized in that the two contact arms and the two conductive areas are disposed on opposite sides of the axis of the hinge.

When the cover rotates, the two contact arms rub on the conductive areas. This rubbing has a self-cleaning effect which assures great reliability of the electrical connection.

Also, the disposition of the contact arms and the conductive areas on either side of the rotation axis of the hinge enables the contact arms to apply to the conductive areas a pressure directed towards the above axis which is divided on either side of that axis. The contact pressure is therefore regular and homogeneous regardless of the angular position of the cover relative to the casing.

The two contact arms and the two conductive areas are preferably symmetrical about the axis of the hinge.

The position of the conductive areas relative to the contact arms is such that when the cover is folded onto the casing the end of one contact arm bears on the insulative material between the two conductive areas.

Accordingly, when the cover is closed, no electrical current flows between the electrical circuit of the casing and the microphone carried by the cover.

This prevents premature wear of the battery powering the device when it is not being used.

In a preferred version of the invention, each contact is a part cut out from a sheet of metal and has three arms, one constituting the contact arm, the second one having one end nested in an insulative material block incorporated in the part of the hinge on the casing and the third arm opposite the first one having its end in contact with the electrical circuit of the casing.

This reduces the number of parts, facilitates assembly and improves reliability.

For the same reasons, the conductive areas are preferably each a part cut out from a sheet of metal, bent to shape, and fixed to an insulative material block incorporated in the hinge of the cover.

In an advantageous version of the invention, the part of the hinge on the casing has a frustoconical surface centered on the axis of the hinge in which nests a complementary frustoconical surface of the part of the hinge on the cover.

This nesting enables perfect centering of the two parts of the hinge and in particular of the contact arms relative to the conductive areas.

The other hinge between the casing and the cover preferably includes a spring pressing the aforementioned two complementary frustoconical surfaces together, a clearance being provided between the two parts of said other hinge to enable the cover to be removed by compressing the spring and disengaging the two complementary frustoconical surfaces.

It is therefore easy to demount the cover to replace it with a new cover.

In one particular version of the invention, the other hinge comprises two surfaces pressed into contact with each other by a spring, one of these surfaces comprising a plurality of raised portions which are angularly offset and engaged in recesses formed in the other surface to define a plurality of angular positions of the cover relative to the casing.

In this way the fully closed position of the cover and that at the optimum position of use can be defined accurately.

Each raised portion preferably has a summit and an up ramp and a down ramp disposed symmetrically on opposite sides of the summit.

The up and down ramps of the raised portions facilitate rotation of the cover whilst assuring accurate positioning of the cover in various preferred positions.

The two surfaces in contact preferably have three raised portions and three recesses offset relative to each other by 120°.

This angular offset by 120° enables the cover to pivot between a closed position and a position offset by 120° in which the microphone on the cover occupies an optimum location for using the telephone.

The two surfaces in contact can preferably be disengaged from each other.

This facilitates removing the cover to replace it with a new cover.

In an advantageous version of the invention, the raised portions and the recesses cooperate with each other to define a position in which the cover is completely folded onto the casing and the rotary contacts incorporated in the other hinge do not make the electrical connection between the electrical circuit and the microphone in the above position and as far as a first angular position of the cover and make the electrical connection when the angular position of the cover is beyond the above first position.

Other features and advantages of the invention will become apparent in the following description.

In the accompanying drawings, which are given by way of non-limiting example:

BRIEF DESCRIPTION OF THE DRAWINGS

FIG. 3 is a view in axial section of the two hinges connecting the casing and the cover of the mobile telephone, FIG. 4 is a view in axial section of the hinge incorporating the rotary contacts, FIG. 5 is a plan view of the insulative block carrying the conductive areas, FIG. 6 is a view analogous to FIG. 5 and showing the two contact arms respectively in contact with a conductive area and a non-conductive area, FIG. 7 is a perspective view of a conductive area, FIGS. 8, 9, 10 and 11 are various diagrammatic plan views showing the position of the contact arms relative to the conductive areas for different positions of the cover, FIG. 12 is a plan view of a surface of one of the hinges between the casing and the cover which is provided with raised portions and recesses.

DETAILED DESCRIPTION OF PREFERRED EMBODIMENTS

Figure 1:
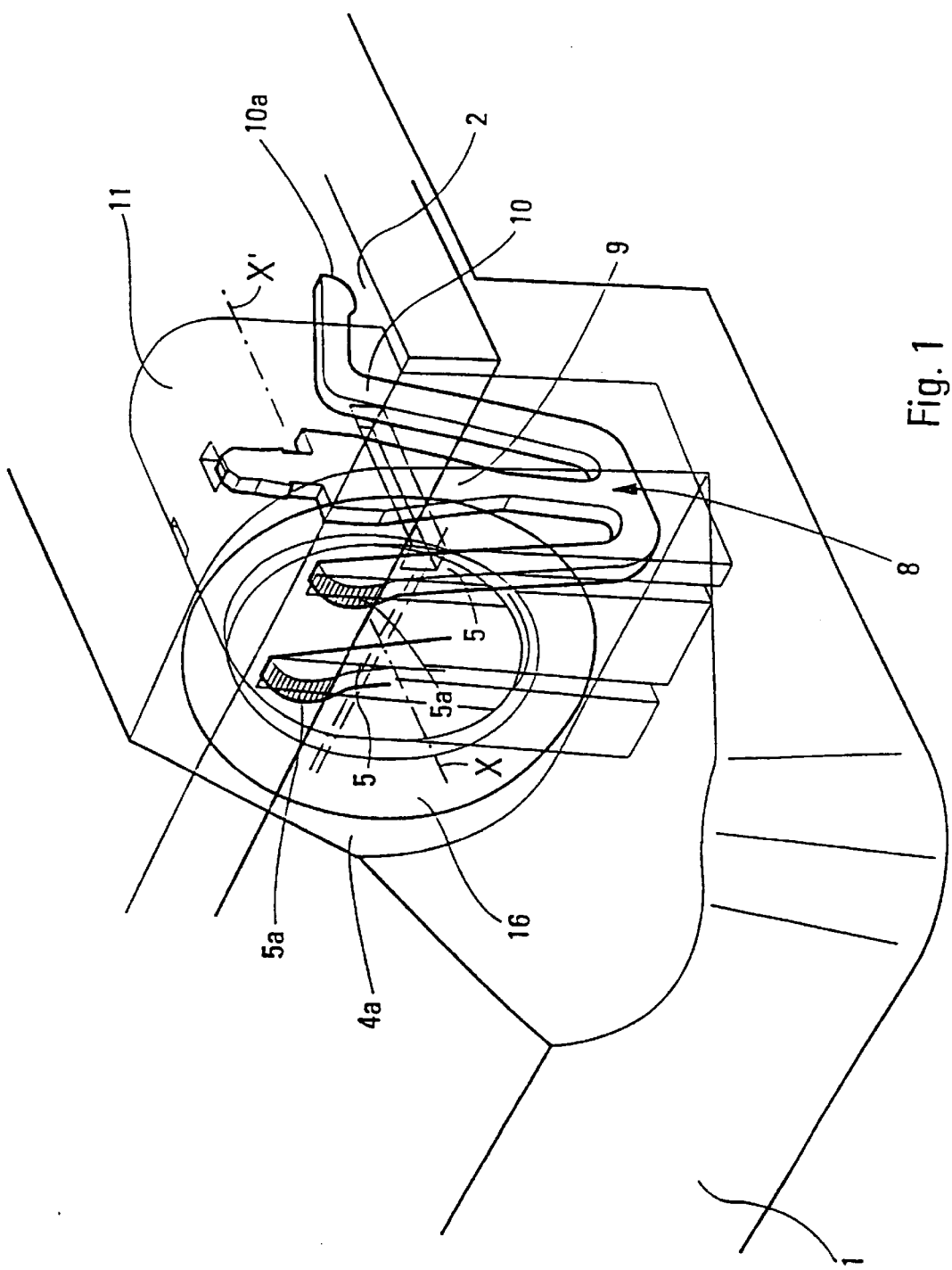
FIG. 1 is a perspective view to a larger scale of the part of the hinge on the casing of a mobile telephone in accordance with the invention, showing the arms of the rotary contact incorporated in the hinge.

In the embodiment shown in FIGS. 1 to 4, the mobile telephone has a casing 1 enclosing an electrical circuit 2 and carrying a cover 3 fixed to the casing 1 in a hinged manner and incorporating a microphone (not shown). Rotary contacts are incorporated in one of the two hinges 4a, 4b connecting the cover 3 to the casing 1 to make electrical connections between the electrical circuit 2 and the microphone.

In accordance with the invention, the hinge 4b between the casing 1 and the cover 3 comprises two contacts attached to the casing 1 and each including a contact arm 5.

The ends 5a of the two contact arms 5 bear elastically on two conductive areas 6 separated by an insulative material 7 and incorporated in the part 4b of the hinge on the cover 3. Accordingly, when the cover 3 rotates, the ends 5a of the two contact arms 5 trace out two circular paths on the conductive areas 6.

In the example shown, the two contact arms 5a and the two contact areas 6 are symmetrical about the axis X–X' of the hinge 4a, 4b.

The position of the conductive areas 6 relative to the contact arms 5 is such that when the cover 3 is folded against the casing 1 the end 5a of one contact arm 5 bears on the insulative material 7 between the two conductive areas 6, as shown in FIGS. 6 and 8.

As shown in FIGS. 1 and 4, each contact comprises a part 8 which is cut out from a sheet of a springy metal that is a good conductor and which comprises three arms 5, 9, 10. One constitutes the contact arm 5, the second one 9 has an end 9a nested in an insulative material block 11 incorporated in the hinge 4a on the casing 1 and the third arm 10 opposite the first one has its end 10a in contact with the printed circuit card constituting the electrical circuit 2 of the casing 1.

Figure 2:
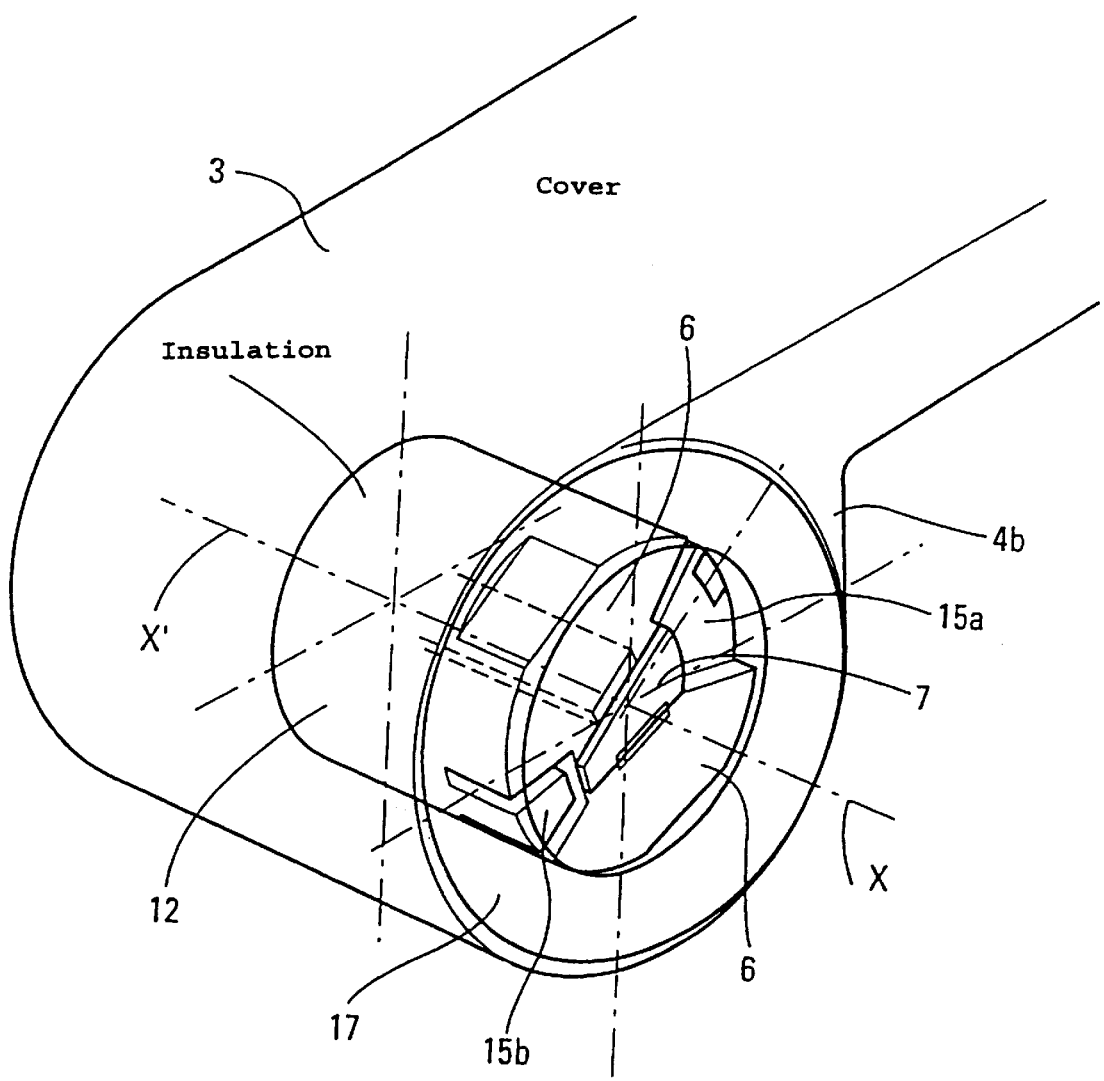
FIG. 2 is a perspective view of the part of the hinge on the cover of the mobile telephone, showing the conductive areas intended to cooperate with the contact arms shown in FIG. 1.

As shown in FIG. 7 in particular, the conductive areas 6 each comprise a part which is cut out from a bent sheet of a metal that is a good conductor and which is fixed to an insulative material block 12 incorporated in the hinge 4b on the cover 3 (see FIGS. 2 and 5).

As shown in FIGS. 2 and 5, the two conductive areas 6 are pressed onto an end face of the insulative material block 12 and each area 6 is connected to a lug 13 perpendicular to the area and extending into the insulative material block 12; each lug 13 is electrically connected to a conductor 14 connected to the microphone (see FIGS. 3 and 4). To this end, the end 15 of each lug 13 is conformed to strip the insulation from the conductor 14.

Also, the two conductive areas 6 are separated, on the one hand, by a central area 7 (see FIG. 2) of insulative material whose surface projects slightly relative to the conductive area 6 and, on the other hand, by two diametrically opposed cavities 15a, 15b.

FIGS. 1 to 4 show that the part of the hinge on the casing 1 has a slightly frustoconical surface 16 centered on the axis X–X' of the hinge in which nests a complementary frustoconical surface 17 of the part of the hinge on the cover 3.

The right-hand portion of FIG. 3 shows the other hinge 18a, 18b between the casing 1 and the cover 3. This hinge comprises a spring 19 pressing together the two complementary frustoconical surfaces 16, 17 mentioned above. There is some clearance between the two parts of the other hinge 18a, 18b to enable the cover 3 to be removed by compressing the spring 19 and disengaging the two complementary frustoconical surfaces 16, 17.

The other hinge 18a, 18b comprises two surfaces 20, 21 pressed against each other by the spring 19. One of these surfaces comprises a plurality of angularly offset raised portions 22 which engage in recesses 23 formed in the other surface to define a plurality of angular positions of the cover 3 relative to the casing 1 (see FIG. 12).

Each raised portion 22 has a summit 24 and an up ramp and a down ramp disposed symmetrically on opposite sides of the summit.

As shown in FIG. 12, the two surfaces in contact comprise three raised portions 22 and three recesses 23 offset from each other by 120°.

The raised portions 22 and recesses 23 cooperate with each other to define a first position in which the cover 3 is folded against the casing 1 and a second position in which the cover 3 is at an angle of approximately 120° to the casing 1.

This second position corresponds to the normal position of use of the telephone.

Also, to enable the spring 19 to move the cover towards its closed position, the position of the raised portions 22 and the recesses 23 is slightly offset (by 5°) relative to an origin corresponding to complete closure of the cover 3.

Moreover, the two surfaces 20, 21 in contact can be disengaged from each other to replace the cover 3 by compressing the spring 19.

Additionally, the raised portions 22 and the recesses 23 cooperate with each other to define a position in which the cover 3 is completely folded onto the casing 1. The contact arms 5 incorporated in the hinge 4a do not make the electrical connection between the electrical circuit 2 and the microphone in the above position and as far as a first angular position of the cover 3, for example a position at 45°. The electrical connection is made when the angular position of the cover 3 is beyond the above first position.

The two contact arms 5 cooperate with the two conductive areas 6 separated by the non-conductive area 7.

The position of the non-conductive area 7 is such that at least one of the two arms 5 is in contact with the non-conductive area 7 between the fully closed position of the cover and its first angular position referred to above.

FIG. 8 shows the position of the two contact arms 5 when the cover 3 is completely closed. One of the arms 5 is between the two conductive areas 6; the electrical connection is not made.

FIG. 9 shows the position of the two arms 5 after the cover has rotated 45°. The two arms 5 are in contact with the conductive areas 6; the electrical connection is made.

FIGS. 10 and 11 show the position of the two arms 5 on 185° and 120° rotation of the cover; in both cases the electrical connection is made.

Of course, the invention is not limited to the embodiments just described to which many modifications can be made without departing from the scope of the invention.

What is claimed is:

1. A mobile telephone comprising a casing (1) enclosing an electrical circuit (2) and carrying a cover (3) fixed to the casing in a hinged manner and incorporating a microphone, rotary contacts being incorporated into one of the two hinges connecting the cover (3) to the casing (1) to make electrical connections between the electrical circuit (2) and the microphone, one of the hinges (4a, 4b) of the casing and the cover comprising two contacts attached to the casing each including a contact arm (5), the ends (5a) of the two contact arms bearing elastically on two conductive areas (6) separated by an insulative material and incorporated in the part (4b) of the hinge on the cover (3) so that on rotation of the cover the ends (5a) of the two contact arms (5) trace out two circular paths on the conductive areas (6), characterized in that the two contact arms (5) and the two conductive areas (6) are disposed on opposite sides of the axis (X–X') of the hinge (4a, 4b).

2. A mobile telephone according to claim 1 characterized in that the two contact arms (5) and the two conductive areas (6) are symmetrical about the axis (X–X') of the hinge (4a, 4b).

3. A mobile telephone according to claim 1 characterized in that the position of the conductive areas (6) relative to the contact arms (5) is such that when the cover (3) is folded onto the casing (1) the end (5a) of one contact arm (5) bears on the insulative material (7) between the two conductive areas (6).

4. A mobile telephone according to claim 1 characterized in that each contact is a part (8) cut out from a sheet of metal and has three arms (5, 9, 10), one constituting the contact arm (5), the second one (9) having one end (9a) nested in an insulative material block (11) incorporated in the hinge (4a) on the casing and the third arm (10) opposite the first one having its end (10a) in contact with the electrical circuit (2) of the casing.

5. A mobile telephone according to claim 1 characterized in that the conductive areas (6) are each a part cut out from a sheet of metal, bent to shape, and fixed to an insulative material block (12) incorporated in the hinge (4b) on the cover (3).

6. A mobile telephone according to claim 5 characterized in that the two conductive areas (6) are applied to an end face of the insulative material block (12) and each area (6) is joined to a lug (13) perpendicular to the area and extending into the insulative material block (12), the lug (13) being connected electrically to a conductor (14) connected to the microphone.

7. A mobile telephone according to claim 6 characterized in that the two conductive areas (6) are separated, firstly, by an insulative material central area (7) whose surface projects slightly relative to the conductive area (6) and, secondly, by two diametrically opposed cavities (15a, 15b).

8. A mobile telephone according to claim 1 characterized in that the hinge (4a) on the casing has a frustoconical surface (16) centered on the axis (X–X') of the hinge in which nests a complementary frustoconical surface (17) of the hinge (4b) on the cover.

9. A mobile telephone according to claim 8 characterized in that the other hinge (18a, 18b) between the casing (1) and the cover (13) includes a spring (19) pressing the aforementioned two complementary frustoconical surfaces (16, 17) together, a clearance being provided between the two parts (18a, 18b) of said other hinge to enable the cover (3) to be removed by compressing the spring (19) and disengaging the two complementary frustoconical surfaces (16, 17).

10. A mobile telephone according to claim 1 characterized in that the other hinge (18a, 18b) comprises two surfaces (20, 21) pressed against each other by a spring (19), one of these surfaces comprising a plurality of angularly offset raised portions (22) which engage in recesses formed in the other surface to define a plurality of angular positions of the cover (3) relative to the casing (1).

11. A mobile telephone according to claim 10 characterized in that each raised portion (22) has a summit (24) and an up ramp and a down ramp disposed symmetrically on opposite sides of the summit.

12. A mobile telephone according to claim 10 characterized in that the two surfaces (20, 21) in contact have three raised portions (22) and three recesses offset relative to each other by 120°.

13. A mobile telephone according to claim 10 characterized in that the raised portions (22) and recesses cooperate with each other to define a first position in which the cover (3) is folded onto the casing (1) and a second position in which the cover (3) is at an angle of approximately 120° to the casing.

14. A mobile telephone according to claim 10 characterized in that the position of the raised portions (22) and the recesses is slightly offset relative to an origin corresponding to complete closure of the cover (3) to enable the cover to be moved towards the closed position by the spring (19).

15. A mobile telephone according to claim 10 characterized in that the two surfaces (20, 21) in contact can be disengaged from each other.

16. A mobile telephone according to claim 10 characterized in that the raised portions (22) and the recesses cooperate with each other to define a position in which the cover (3) is completely folded onto the casing (1) and the rotary contacts incorporated in the other hinge do not make the electrical connection between the electrical circuit (2) and the microphone in the above position and as far as a first angular position of the cover (3) and make the electrical connection when the angular position of the cover (3) is beyond the above first position.

17. A mobile telephone according to claim 16 characterized in that the rotary contacts comprise two contact arms (5) cooperating with two conductive areas (6) separated by a non-conductive area (7), the position of the latter being such that at least one of the two arms (5) is in contact with the non-conductive area (7) between the fully closed position of the cover (3) and said first angular position thereof.

* * * * *